(12) United States Patent
Stewart

(10) Patent No.: US 6,799,353 B1
(45) Date of Patent: Oct. 5, 2004

(54) PORTABLE SUPPORT HANDLE TO ASSIST USERS TO SAFELY EXIT AND ENTER A MOTOR VEHICLE

(75) Inventor: Ian A. Stewart, Victoria (CA)

(73) Assignee: Avenue Innovations, Inc., Victoria (CA)

( * ) Notice: Subject to any disclaimer, the term of this patent is extended or adjusted under 35 U.S.C. 154(b) by 313 days.

(21) Appl. No.: 09/890,288
(22) PCT Filed: Sep. 13, 2000
(86) PCT No.: PCT/CA00/01077
  § 371 (c)(1),
  (2), (4) Date: Dec. 3, 2001
(87) PCT Pub. No.: WO01/19642
  PCT Pub. Date: Mar. 22, 2001

(30) Foreign Application Priority Data

Sep. 13, 1999 (CA) .............................. 2284236

(51) Int. Cl.⁷ .............................. A45C 13/22; B60J 9/00
(52) U.S. Cl. .......................... 16/422; 16/110.1; 16/436; 296/1.02
(58) Field of Search ...................... 16/DIG. 7, DIG. 18, 16/DIG. 24, DIG. 25, DIG. 32, 422, 429, 430, 431, 110.1, 436; 296/71, 1.02, 1.01

(56) References Cited

U.S. PATENT DOCUMENTS

| | | | | |
|---|---|---|---|---|
| 2,245,899 A | * | 6/1941 | Campbell | 280/748 |
| 2,261,395 A | | 11/1941 | Claude-Mantle | 105/354 |
| 2,586,986 A | | 2/1952 | Orrison | 105/354 |
| 2,768,590 A | * | 10/1956 | Otto et al. | 105/354 |
| 3,182,606 A | | 5/1965 | Osgood | 105/354 |
| 3,582,124 A | | 6/1971 | Quirk, Jr. | 294/26 |
| 3,739,793 A | | 6/1973 | Wilson | 135/45 |
| 4,062,372 A | | 12/1977 | Slusher | 135/66 |
| 4,072,339 A | * | 2/1978 | Rothlisberger | 296/71 |
| 4,183,177 A | | 1/1980 | Kurdziel | 49/25 |
| 4,314,576 A | | 2/1982 | McGee | 135/67 |
| 4,600,239 A | | 7/1986 | Gerstein et al. | 297/349 |
| 4,626,016 A | | 12/1986 | Bergsten | 296/1 R |
| 4,843,661 A | | 7/1989 | Skibinski | 5/81 R |
| 4,922,560 A | | 5/1990 | Skibinski | 5/81 R |
| 5,104,169 A | | 4/1992 | Kopnski | 296/1.1 |
| 5,323,511 A | | 6/1994 | Gray | 16/114 R |
| 5,640,986 A | | 6/1997 | Herman | 135/68 |
| 5,765,987 A | | 6/1998 | Zimmermann | 414/786 |
| 5,787,515 A | | 8/1998 | Mason et al. | 4/254 |
| 5,855,408 A | * | 1/1999 | Rickabus | 296/214 |
| 5,913,562 A | | 6/1999 | Mattarella et al. | 296/152 |
| 5,924,768 A | * | 7/1999 | Ramos | 297/183.6 |
| 6,340,189 B1 | | 1/2002 | Pordy | 296/1.1 |

FOREIGN PATENT DOCUMENTS

| | | |
|---|---|---|
| CA | 1276081 | 11/1990 |
| GB | 2347457 B | 9/2000 |

* cited by examiner

Primary Examiner—Robert J. Sandy
Assistant Examiner—André L. Jackson
(74) Attorney, Agent, or Firm—Davis Wright Tremaine LLP; George C. Rondeau, Jr.

(57) ABSTRACT

A portable support handle for assisting individuals in exiting and entering motor vehicles. The support handle is designed to removably engage a door striker pin of the vehicle when the door is in an open position. The handle preferably comprises a metal shaft including a pin engagement portion sized to lockably fit into an opening defined by the striker pin in a deployed position; and a grip portion which extends laterally from the striker pin in the deployed position to provide a secure, readily accessible temporary support.

10 Claims, 8 Drawing Sheets

PORTABLE SUPPORT HANDLE TO ASSIST USERS TO SAFELY EXIT AND ENTER A MOTOR VEHICLE

TECHNICAL FIELD

This application relates to a portable support handle for assisting individuals in exiting and entering motor vehicles. The support handle is designed to removably engage a door striker pin of the vehicle when the door is in an open position.

BACKGROUND

Individuals having mobility impairment, such as the elderly, disabled and expectant mothers, often have difficulty exiting and entering motor vehicles. Many such individuals are not capable of easily moving from a sitting position inside the vehicle to a standing position outside the vehicle, or vice versa, without assistance. The problem is exacerbated by the fact that many vehicles sit low to the ground for improved handling and fuel economy, thereby requiring more physical strength and effort for vehicle occupants to rise to a standing position.

For example, elderly drivers having reduced leg strength and flexibility typically attempt to support themselves when exiting a vehicle by grabbing hold of the open car door and pushing upwardly. Additionally or alternatively such drivers may brace one arm on the car seat cushion or door frame while twisting their torso outwardly. These movements may result in strain and accidental falls. More particularly, the vehicle door provides insufficient support for many users. Since the vehicle door swings on a hinge it is not secure and may be difficult to reach if the door is fully open. Similarly, the seat cushion and door frames of most cars also do not include gripping points which are secure and easily accessible. The possibility of accidental falls and injuries increases in the case of slippery conditions (i.e. due to snow, ice, wet pavement or the like).

The ability to safely exit and enter a vehicle without assistance from another person is often important in maintaining the independence and self-esteem of elderly and disabled drivers. Some vehicle entry and egress systems are known in the prior art to address this problem. For example, U.S. Pat. No. 5,104,169, Kopnski, dated 14 Apr. 1992, relates to a handicap assist apparatus for securement to a roof above the passenger compartment of a vehicle. The apparatus includes a flexible tether line for grasping by the handicapped person.

U.S. Pat. No. 4,626,016, Bergsten, dated 2 Dec. 1986 also exemplifies the prior art. Bergsten discloses a structural aid for facilitating egress from a vehicle which includes sleeve means mounted in the vehicle door frame and a handlebar insertable therein. The sleeve means includes a mounting plate which is secured to the door post flange with fasteners and a sleeve which is welded to the mounting plate.

Such prior art systems require structural modification of the vehicle in question which requires skilled labour, is relatively expensive and may potentially invalidate product warranties and insurance coverage. Furthermore, many known prior art systems are relatively complex and cumbersome and are therefore unsuitable for individuals who are mildly or temporarily disabled or who wish to use the mobility aid on several different vehicles.

The need has therefore arisen for a portable support handle securely connectable to the standard door striker pin of a motor vehicle for assisting users to safely enter and exit the vehicle.

SUMMARY OF INVENTION

In accordance with the invention, a portable support handle for removably engaging a striker pin mounted on the door frame of a vehicle is provided. The striker pin defines an opening for receiving the door latch of the vehicle when the vehicle door is closed, but ordinarily does not serve a useful purpose when the door is opened. The support handle comprises an elongated shaft having a first end and a second end; a pin engagement portion located at the first end, the pin engagement portion having a longitudinal axis; and a hand grip located at the second end. The support handle is characterized in that the pin engagement portion is moveable between a disengaged position freely moveable relative to the striker pin and an engaged position wherein the pin engagement portion is lockably coupled to the striker pin and the hand grip extends outwardly of the vehicle to provide a temporary support.

Preferably the pin engagement portion is insertable through the striker pin opening and is rotatably adjustable about its longitudinal axis between the engaged and disengaged positions. In one embodiment the pin engagement portion is rotatable approximately 45 degrees between the engaged and disengaged positions. The pin engagement portion may comprise a body having a transverse axis extending between opposed side surfaces of the body, wherein the pin engagement portion is insertable through the opening only when the transverse axis is aligned with the widest portion of the opening. For example, if the striker pin opening is rectangular in shape, the widest portion would consist of the diagonal of the opening and the pin engagement portion would be insertable through the opening when the transverse axis is aligned with the diagonal.

More particularly, the pin engagement portion may comprise a neck portion having a transverse dimension less than the width of the opening and a head portion tapering outwardly from the neck portion in a direction away from the longitudinal axis, the head portion having a transverse dimension which exceeds the width and length of the opening but which is less than the diagonal of the opening. In a preferred embodiment of the invention, the said side surfaces of the body are bevelled at least in the head portion of the pin engagement portion to enable passage of the pin engagement portion through the opening.

The support handle may further include a central portion extending between the pin engagement portion and the hand grip which is of a size incapable of passing through the striker pin opening. Preferably the pin engagement portion is inclined relative to the central portion such that said longitudinal axis of said pin engagement portion intersects the longitudinal axis of the central portion at an angle of approximately 15 degrees. The hand grip may also be inclined relative to the central portion and pin engagement portion such that the hand grip has a horizontal or near-horizontal orientation in the engaged position.

BRIEF DESCRIPTION OF DRAWINGS

In drawings which illustrate embodiments of the invention but which should not be construed as restricting the spirit or scope of the invention in any way.

DESCRIPTION OF THE PREFERRED EMBODIMENT

Figure 1:
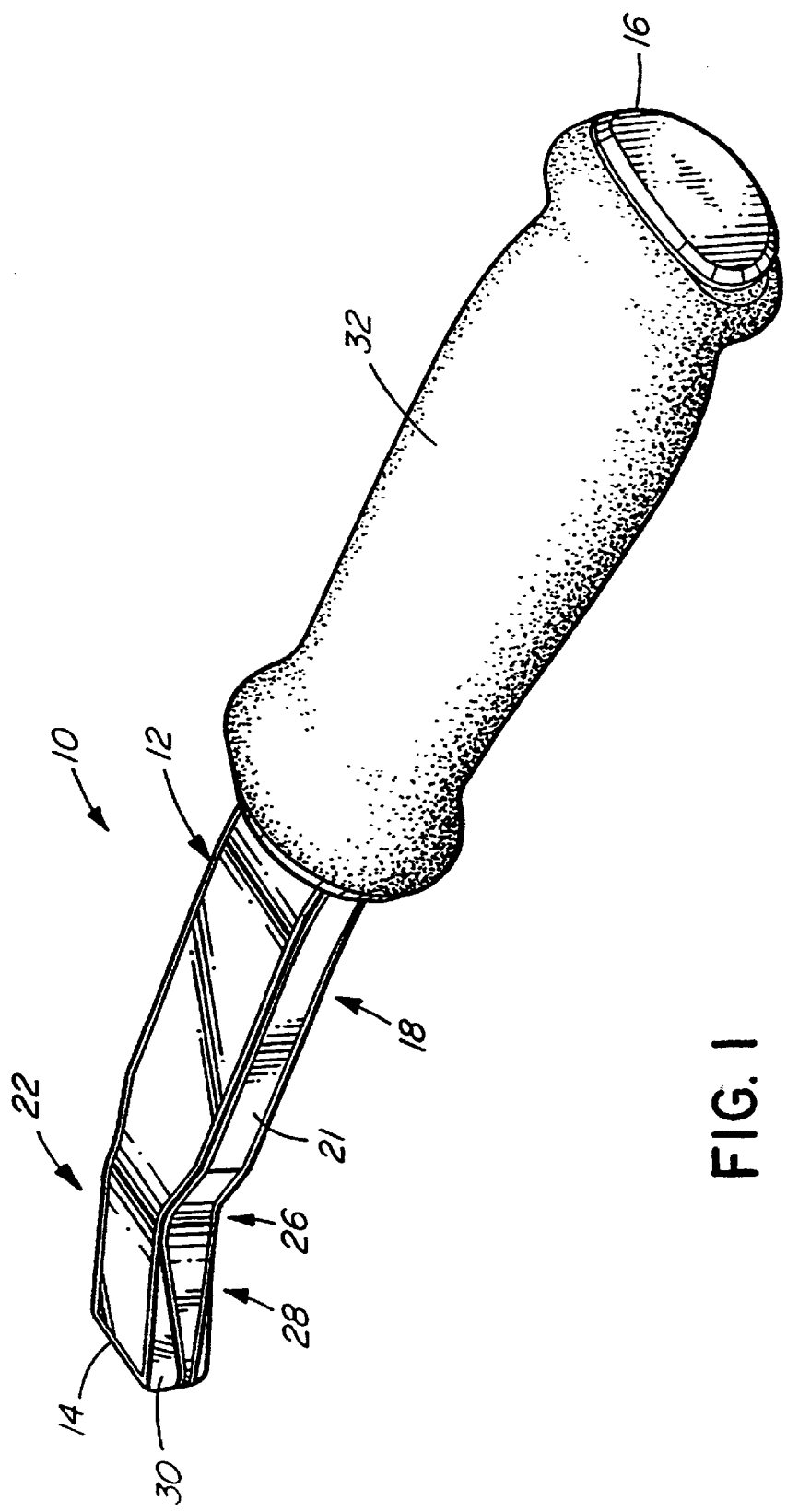
FIG. 1 is a rear isometric view of the applicant's support handle.

This application relates to a portable support handle 10 for use as a mobility aid to assist users in safely entering and exiting motor vehicles. With reference to FIGS. 1–5, handle 10 includes an elongated shaft 12 having a first end 14 and a second end 16. Shaft 12 has a central portion 18 having a generally flat surface 20 (FIG. 4). Central portion 18 further includes flat, parallel side surfaces 21 which extend in a plane perpendicular to surface 20.

Figure 4A:
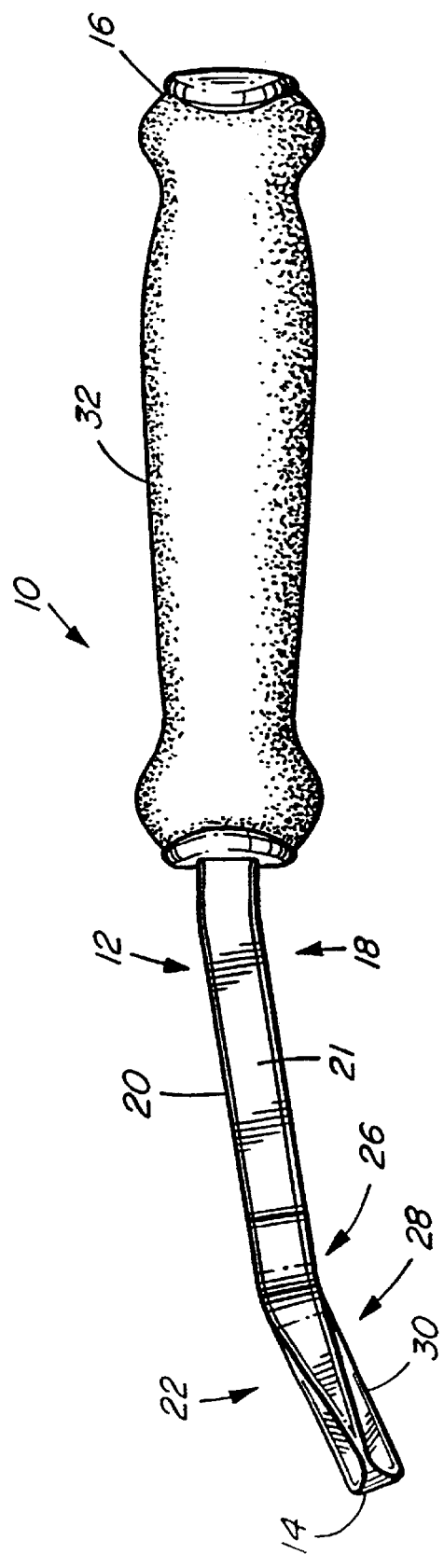
FIG. 4(a) is a side elevational view thereof.
Figure 4B:
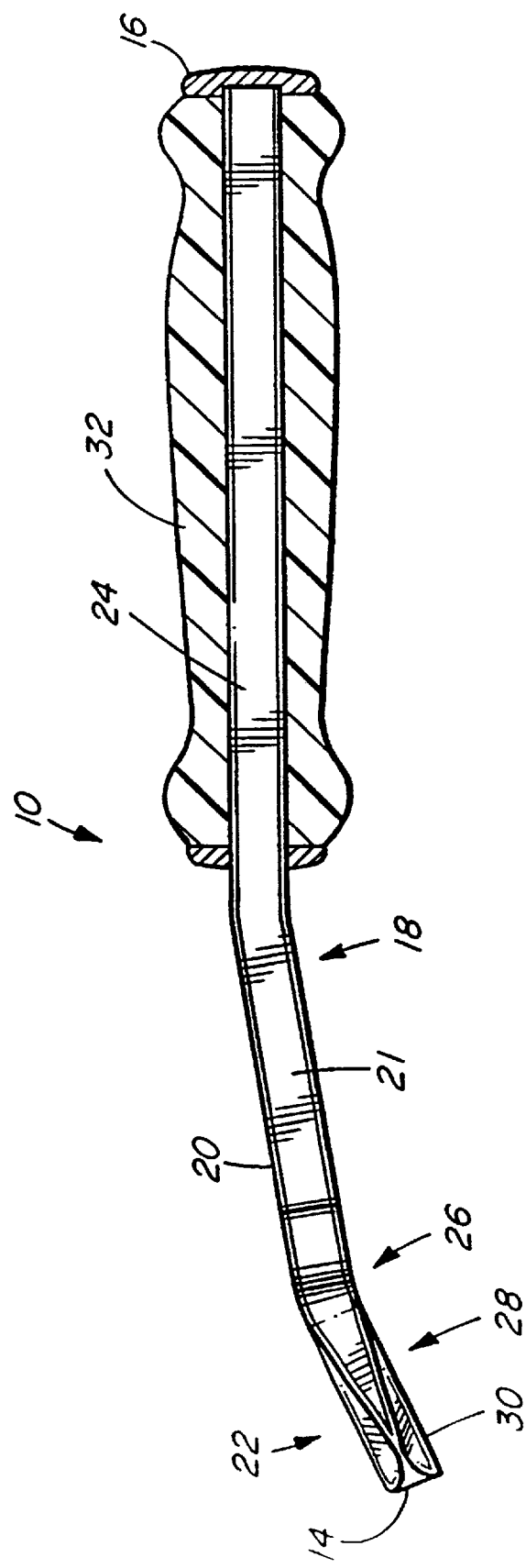
FIG. 4(b) is a longitudinal sectional view thereof.

A pin engagement portion 22 extends from central portion 18 to first end 14 and a grip portion 24 extends from central portion 18 to second end 16 (FIG. 4(b)). As shown best in FIGS. 4(a) and 4(b), both pin engagement portion 22 and grip portion 24 are inclined at an angle (e.g. 15%) relative to the plane of surface 20.

Figure 2:
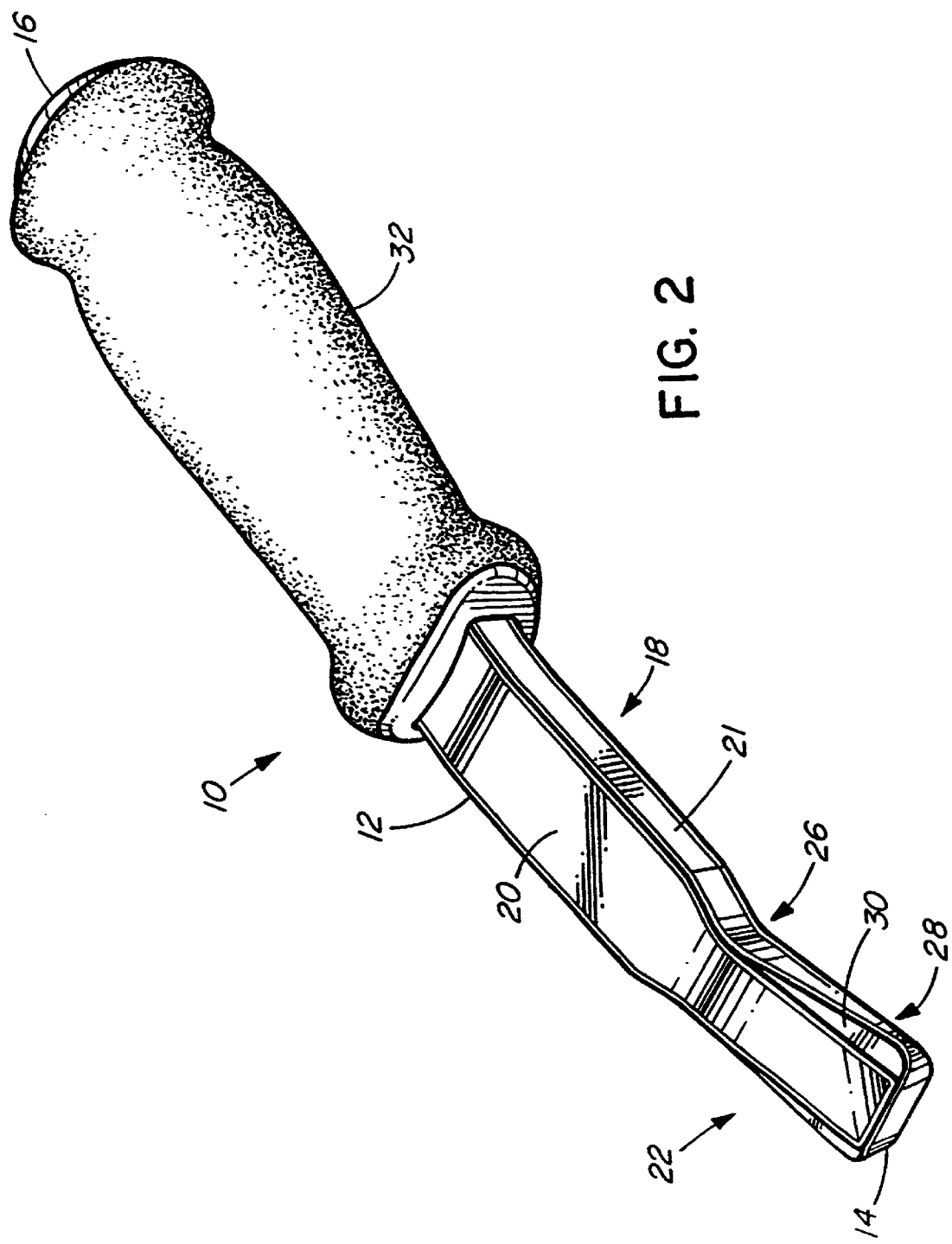
FIG. 2 is a front isometric view of the applicant's support handle.
Figure 3:
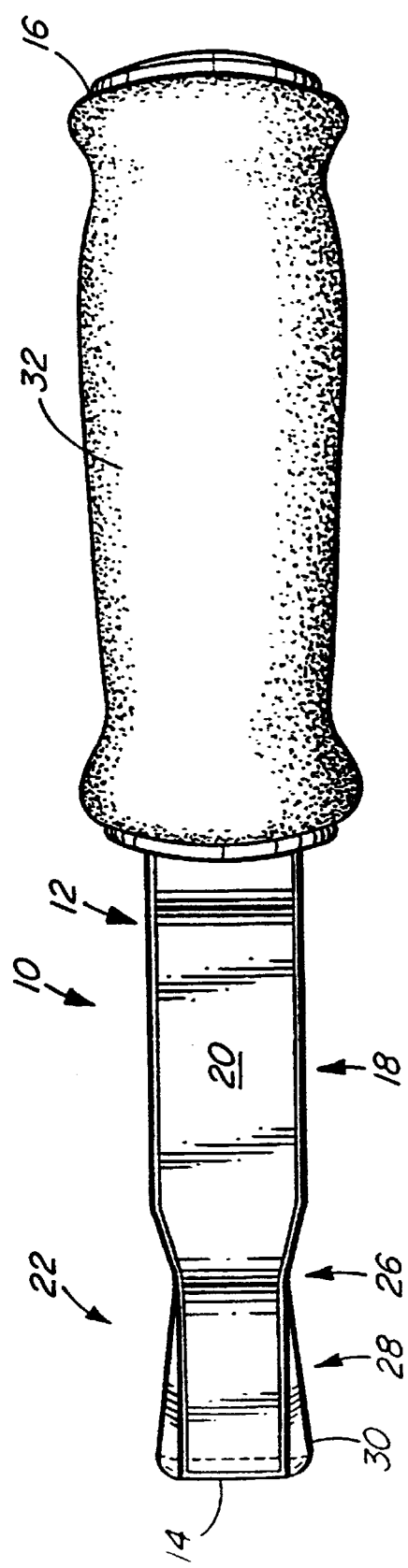
FIG. 3 is a top plan view thereof.

Pin engagement portion 22 includes a narrow neck 26 which tapers inwardly from central portion 18 and a flared head 28 which tapers gently outwardly from neck 26 to first end 14. The side surfaces 30 of flared head 28 are bevelled as shown in FIGS. 2 and 3.

Handle 10 further includes a hand grip 32 which preferably surrounds grip portion 24 of shaft 12. Hand grip 32 may be made of any suitable non-slip material, such as closed cell polymer foam. Shaft 12 is preferably made of high tension stainless steel.

Figure 5:
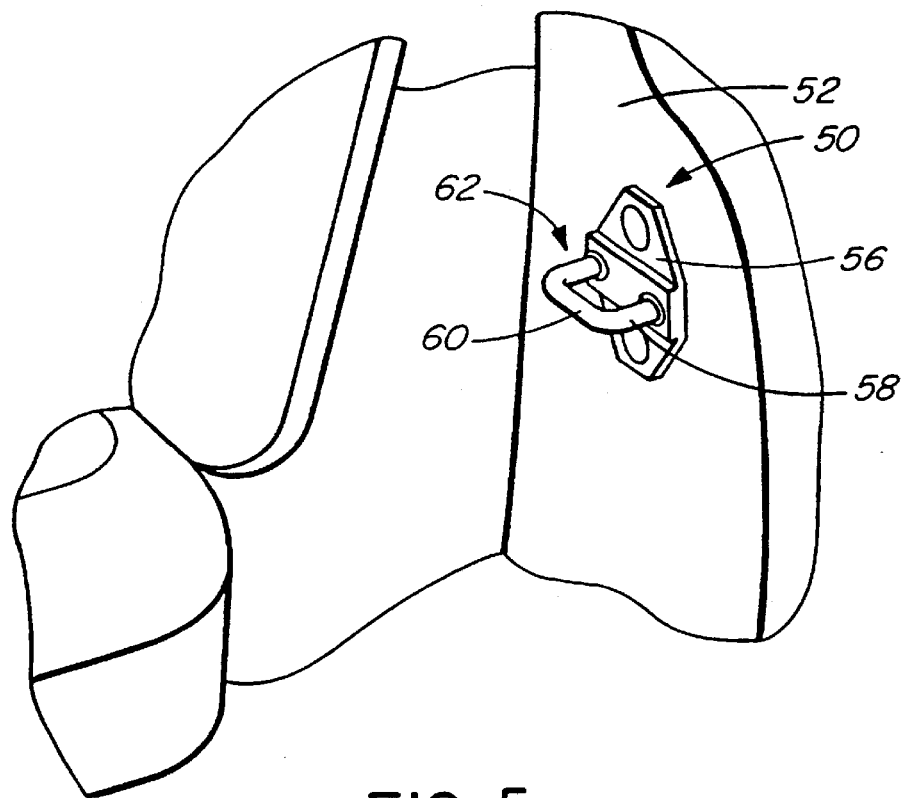
FIG. 5 is an isometric view of a striker pin assembly mounted on the vehicle door frame.

Support handle 10 is designed to securely and removably engage the door striker pin 50 of a motor vehicle, such as a car or truck. Striker pin 50 is designed to receive the locking latch of the vehicle door to hold the door locked in the closed position and to hold the door to the door frame in the case of impact. In most vehicles striker pin 50 is a U-shaped rod mounted on the pillar 52 of the door frame 54 (FIG. 5). Striker pin 50 ordinarily does not have a functional purpose when the door is opened.

Figure 6:
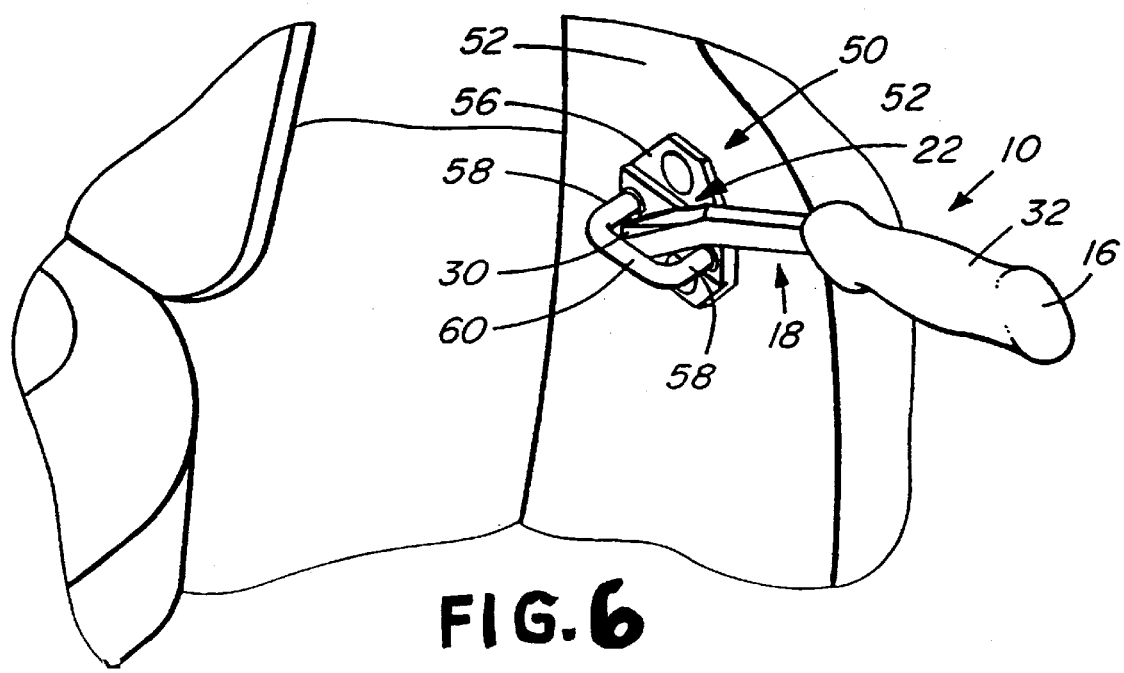
FIG. 6 is an isometric view showing the applicant's handle in a disengaged position being inserted into the striker pin opening.

As shown in FIG. 6, striker pin 50 includes a mounting plate 56 secured to door pillar 52 and two parallel spaced-apart rod segments 58 which extend outwardly from plate 56. Segments 58 are joined at a location distal from plate 56 by rod segment 60. Striker pin rod segments 58, 60 together define a rectangular opening 62. The size of opening 62 varies depending upon vehicle model. Most Japanese and domestic passenger vehicles have an opening 62 on the order of 21 or 22 mm square. The diagonal of opening 62 (i.e. the dimension measured from corner to corner) is ordinarily approximately 26 mm.

An important feature of applicant's invention is that support handle 10 is designed so that only the pin engagement portion 22 of shaft 12 is sized to pass through striker pin opening 62. In one embodiment of the invention, handle shaft central portion 18 has a width of approximately 22.5 mm; neck 26 has a minimum width of approximately 15 mm; and flared head 28 has a maximum width of approximately 23.5 mm. The hand grip 32 surrounding grip portion 24 has a much wider diameter (i.e. on the order of 40 mm). Since the width of flared head 28 exceeds the space between parallel striker pin rod segments 58, and between rod segment 60 and mounting plate 56, pin engagement portion 22 is only insertable through opening 62 on the diagonal. Once inserted, handle 10 is fully rotatable within opening 62 since neck 26 has a much smaller diameter than flared head 28 as discussed above (FIG. 6). Central portion 18 is sized so that it is not insertable through opening 62 in any orientation. Although central portion 18 has a width similar to flared head 28, side surfaces 21 are not bevelled unlike head side surfaces 30. The edges of side surfaces 21 accordingly engage rod segments 58, 60 when handle 10 is moved into opening 62, thereby preventing the insertion of shaft central portion 18 through opening 62.

Figure 7:
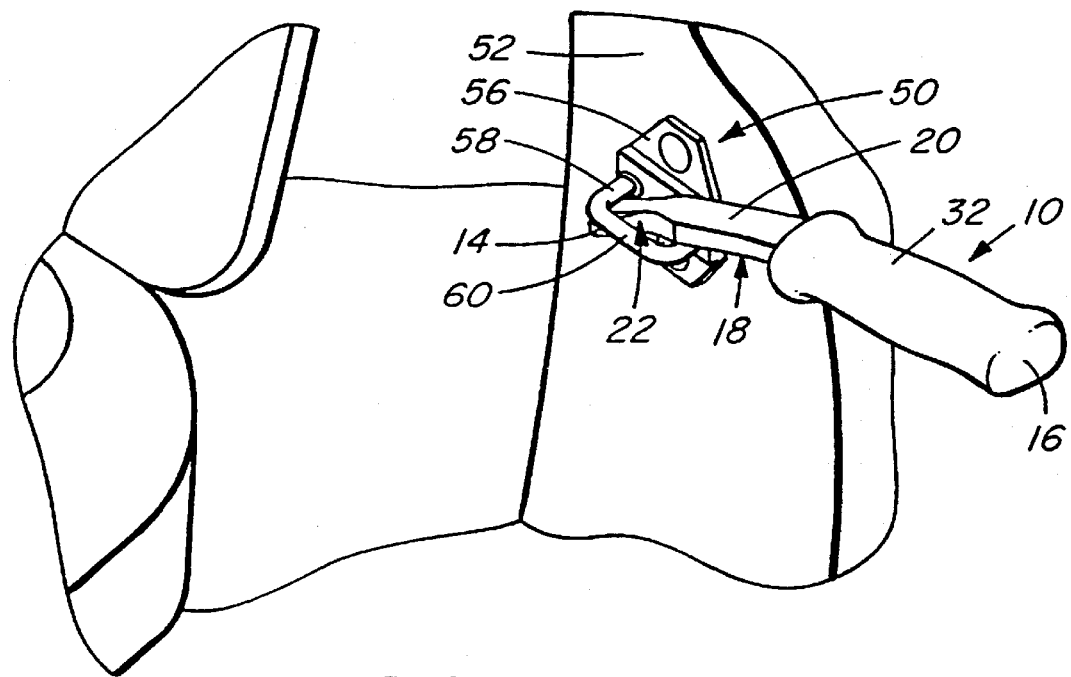
FIG. 7 is an isometric view of the handle in the engaged, locked position.
Figure 8:
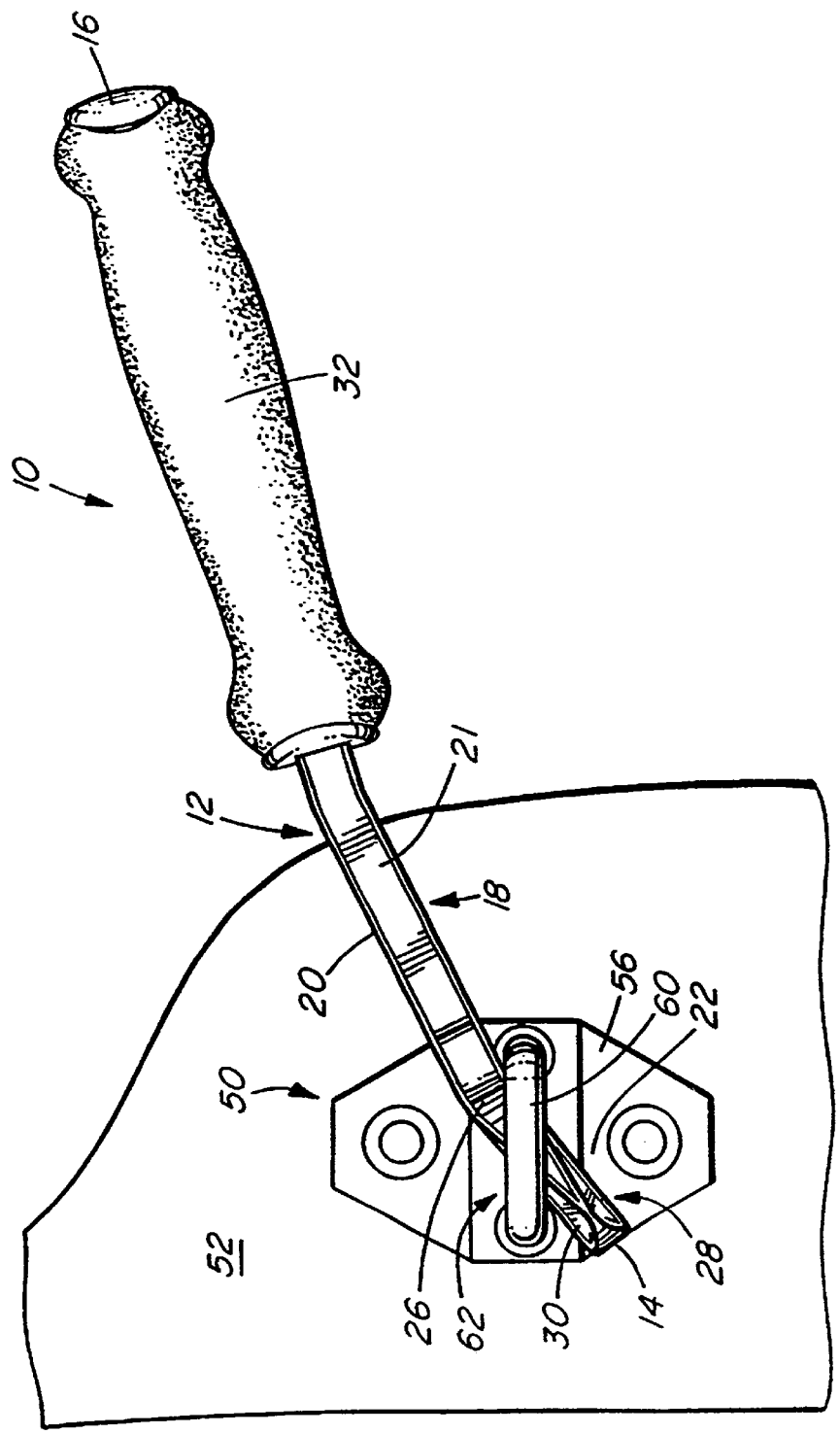
FIG. 8 is a side elevational view of the handle of FIG. 7.

In use, handle 10 is used to provide additional support to users having difficulty exiting or entering motor vehicles. A vehicle occupant first opens an adjacent car door to expose door striker pin 50. The user next grasps hand grip 32 and inserts the pin engagement portion 22 of shaft 12 through striker pin opening 62 in a diagonal orientation as discussed above (FIG. 6). Once flared head 28 has passed through opening 62, the user rotates handle 10 until grip 32 extends laterally outwardly of striker pin 50 in a horizontal or near horizontal plane (FIGS. 7 and 8). Handle 12 is self-locking in this support position. In particular, handle shaft 12 cannot move further into opening 62 due to engagement of central portion 18 against striker rod plate 56 and segments 58, 60; and handle shaft 12 cannot be withdrawn from opening 62 due to engagement of flared head 28 against plate 56 and rod segment 60.

Once handle 10 has been coupled to striker pin 50 as aforesaid, it can be used to support a user rising from a sitting position inside a motor vehicle to a standing position outside the vehicle. In this support position handle 10 functions acts as a lever, namely a downward force applied to grip 32 (as the user presses downwardly on grip 32 to support his or her weight) causes the upper surface of flared head 28 to more forcefully engage striker rod segment 58. Accordingly, handle 10 provides a very stable and reliable support which is readily accessible. Striker pin 50 and support handle 10 are sufficiently strong to support very heavy loads (exceeding the weight of any ordinary user).

Figure 9:
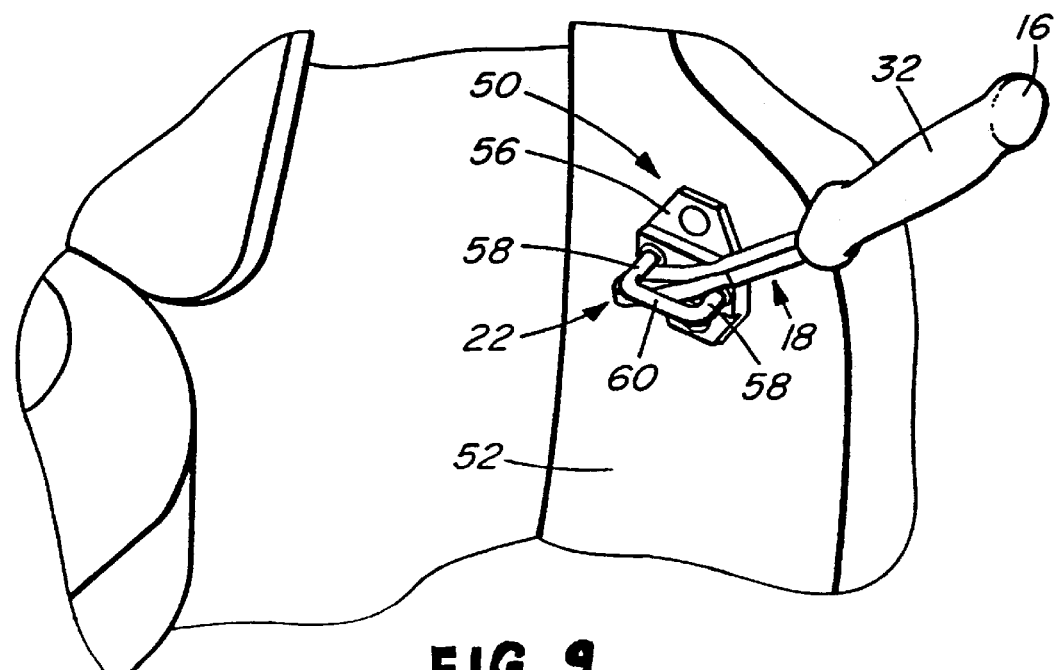
FIG. 9 is an isometric view of the handle coupled to the striker pin in an alternative orientation.

Handle 10 may be used similarly to assist users moving from a standing position outside a motor vehicle to a sitting position inside the vehicle. As.shown in FIG. 9, handle 10 may also optionally be oriented so that surface 20 faces downwardly and grip 32 extends at an angle of approximately 45% relative to striker pin 50. In this position the user can apply a pulling rather than a pushing force to grip 32. Again, the larger force that is applied to grip 32 by the user, the more securely flared head 22 will engage striking pin 50.

After a user has safely moved to the desired location, support handle 10 may be disengaged from striker pin 50 by rotating handle 10 approximately 45 degrees to the diagonal orientation and withdrawing it from opening 62. When not in use, handle 10 may be stowed in the glove compartment of the vehicle or any other easily accessible location, such as a sheath affixed to the vehicle door panel.

In alternative embodiments of the invention, the grip portion 24 of handle may include a cavity for housing optional accessories, such as a portable flashlight, reflector, personal panic device (siren) or a supply of pepper spray. Handles 10 could be provided in a wide range of decorative colors and shapes.

As will be readily apparent to a person skilled in the art, in other alternative embodiments of the invention, handle 10 may be designed to removably engage the door striker pin 50 by other mechanical means, such as self-closing clamping devices or shafts having pin engagement portions contoured in different shapes.

Figure 10A:
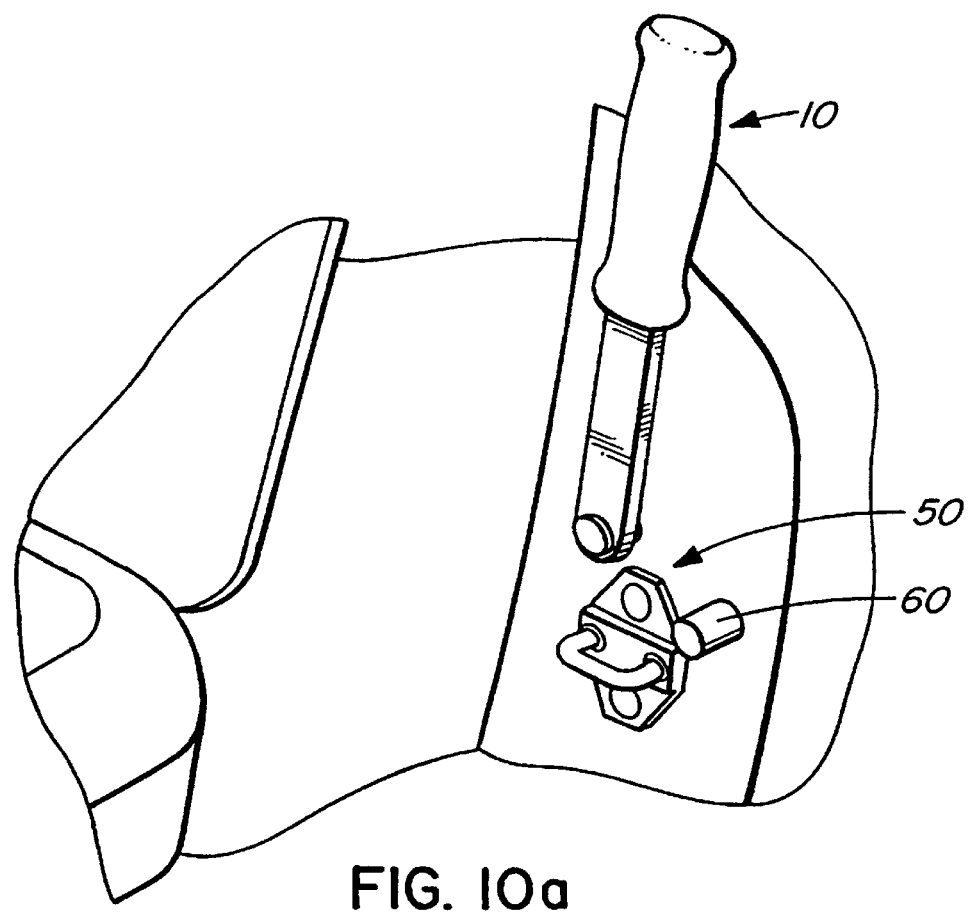
FIG. 10(a) is an isometric, partially exploded view of an alternative embodiment of the invention coupled to the vehicle door frame and shown in the stowed position.
Figure 10B:
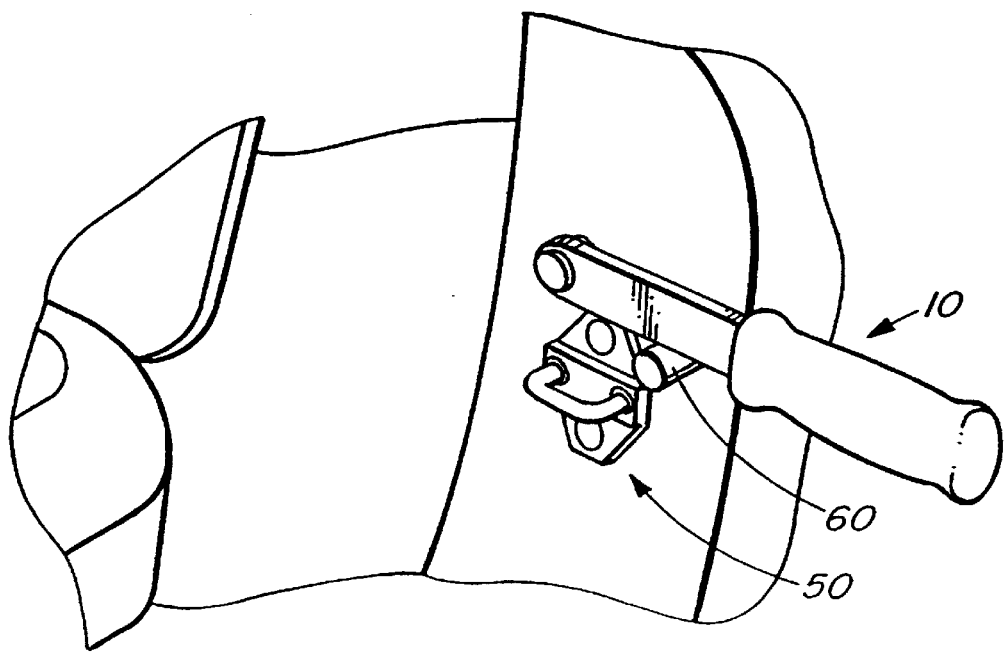
FIG. 10(b) is an isometric view of the embodiment of FIG. 10(a) shown in the deployed position.

Further, in an alternative embodiment of the invention shown in FIGS. 10(*a*) and 10(*b*), handle 10 could be pivotably coupled to the vehicle door frame and moveable between stowed and deployed positions rather than being fully portable. A stop 60 is may be mounted on the vehicle door frame to support handle 10 in the deployed position As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A portable support handle for removably engaging a striker pin mounted on the door frame of a vehicle, the striker pin defining an opening, wherein said support handle comprises an elongated shaft having a first end and a second end; a pin engagement portion having a longitudinal axis, said pin engagement portion being located at said first end; and a hand grip located at said second end, wherein said support handle is characterized in that: said pin engagement portion is moveable between a disengaged position freely movable relative to said striker pin and an engaged position wherein said pin engagement portion is lockably coupled to said striker pin, said pin engagement portion comprises a body having a transverse axis extending between opposed side surfaces of said body, wherein said pin engagement portion is insertable through said opening only when said transverse axis is aligned with a widest portion of said opening, and said opening is rectangular in shape, said widest portion being the diagonal of said opening, wherein said pin engagement portion comprises a neck portion having a transverse dimension less than the width of said opening and a head portion tapering outwardly from said neck portion in a direction away from said longitudinal axis, wherein said head portion has a transverse dimension which exceeds the width and length of said opening but which is less than the diagonal of said opening.

2. The support handle of claim 1, wherein said pin engagement portion is rotatably adjustable about said longitudinal axis between said engaged and disengaged positions.

3. The support handle of claim 1, wherein said transverse axis is in alignment with said widest portion of said opening in said disengaged position and is rotated out of alignment with said widest portion in said locked position.

4. The support handle of claim 1, wherein said side surfaces of said body are bevelled at least in said head portion of said pin engagement portion to enable passage of said pin engagement portion through said opening.

5. The support handle of claim 1, wherein said handle further comprises a central portion extending between said pin engagement portion and said hand grip and having a longitudinal axis, wherein said central portion is sized to not fit through said opening.

6. The support handle of claim 1, wherein said pin engagement portion is inclined relative to said central portion such that said longitudinal axis of said pin engagement portion intersects said longitudinal axis of said central portion at an angle of approximately 15 degrees.

7. The support handle of claim 1, wherein said pin engagement portion and said central portion comprise integral portions of said shaft.

8. The support handle of claim 1, wherein said striker pin comprises a U-shaped bar defining said opening, said bar functioning as a fulcrum for supporting limited pivoting motion of said handle relative to said striker pin.

9. The support handle of claim 1, wherein said pin engagement portion is insertable through said opening and is rotatably adjustable about said longitudinal axis between said engaged and disengaged positions.

10. The support handle of claim 9, wherein said pin engagement portion is rotatable approximately 45 degrees between said engaged and disengaged positions.

\* \* \* \* \*